(12) United States Patent
Jung et al.

(10) Patent No.: US 12,539,983 B2
(45) Date of Patent: Feb. 3, 2026

(54) SYSTEM AND METHOD FOR PREDICTING TRAJECTORY OF OBJECT

(71) Applicant: KOREA AEROSPACE RESEARCH INSTITUTE, Daejeon (KR)

(72) Inventors: Okchul Jung, Daejeon (KR); Jaedong Seong, Daejeon (KR); Youyeun Jung, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 748 days.

(21) Appl. No.: 17/901,011

(22) Filed: Sep. 1, 2022

(65) Prior Publication Data

US 2023/0070518 A1 Mar. 9, 2023

(30) Foreign Application Priority Data

Sep. 3, 2021 (KR) .......................... 10-2021-0117437

(51) Int. Cl.
*B64G 3/00* (2006.01)
*B64G 1/24* (2006.01)
*B64G 1/62* (2006.01)
*G06N 3/08* (2023.01)

(52) U.S. Cl.
CPC .............. *B64G 3/00* (2013.01); *B64G 1/244* (2019.05); *G06N 3/08* (2013.01); *B64G 1/62* (2013.01)

(58) Field of Classification Search
CPC . B64G 3/00; B64G 1/244; B64G 1/62; B64G 1/242; G06N 3/08; G06N 3/0442
See application file for complete search history.

(56) References Cited

U.S. PATENT DOCUMENTS

2021/0292011 A1* 9/2021 Limotta .................... G06N 3/04
2022/0058922 A1* 2/2022 Bai .......................... G06N 20/10

FOREIGN PATENT DOCUMENTS

JP 2020-66365 A 4/2020

OTHER PUBLICATIONS

Peng, Improving orbit prediction accuracy through supervised machine learning, pp. 2628-2646 (Year: 2018).*
Jung, O. et al., "Recurrent neural network model to predict re-entry trajectories of uncontrolled space objects", Advances in Space Research, vol. 68, No. 6, pp. 2515-2529, May 4, 2021.
Eun-Jung Choi, "Development of a Software for Re-Entry Prediction of Space Objects for Space Situational Awareness", Journal of Space Technology and Applications, 2021, pp. 23-32, vol. 1, No. 1.

* cited by examiner

*Primary Examiner* — Albert M Phillips, III
(74) *Attorney, Agent, or Firm* — Rabin & Berdo, P.C.

(57) ABSTRACT

A method for predicting trajectory of an object includes constructing a training data set using past actual orbital information of a target object, wherein the training data set includes a plurality of pairs of input sequence data corresponding to a trajectory in a first section before a reference point, and output sequence data corresponding to a trajectory in a second section after the reference point, training an object trajectory prediction model using the training data set, and predicting the trajectory of the prediction target object after the reference point, by inputting input sequence data corresponding to an actual trajectory of the prediction target object before the reference point into the object trajectory prediction model.

14 Claims, 8 Drawing Sheets

FIG. 6

| ALT | trj #1 | trj #2 | trj #3 | trj #4 | trj #5 | trj #6 | ... | trj #208 | trj #209 | trj #210 | trj #211 |
|---|---|---|---|---|---|---|---|---|---|---|---|
| 200.0 | 0.0 | 0.0 | 0.0 | 0.0 | 0.0 | 0.0 | | 0.0 | 0.0 | 0.0 | 0.0 |
| 195.0 | 9.5 | 13.3 | 23.7 | 16.2 | 10.4 | 13.2 | | 8.9 | 3.3 | 6.3 | 14.2 |
| 190.0 | 17.6 | 24.3 | 43.2 | 29.7 | 19.3 | 24.5 | | 16.6 | 6.2 | 11.7 | 26.5 |
| 185.0 | 24.6 | 33.3 | 59.0 | 40.9 | 26.8 | 34.2 | | 23.1 | 8.6 | 16.4 | 37.0 |
| 180.0 | 30.5 | 40.8 | 71.8 | 50.2 | 33.2 | 42.4 | | 28.7 | 10.6 | 20.4 | 46.0 |
| 175.0 | 35.5 | 46.9 | 82.0 | 57.8 | 38.4 | 49.3 | | 33.4 | 12.2 | 23.8 | 53.5 |
| 170.0 | 39.8 | 51.9 | 90.1 | 63.9 | 42.8 | 55.2 | | 37.4 | 13.6 | 26.6 | 59.8 |
| 165.0 | 43.4 | 56.0 | 96.5 | 68.9 | 46.5 | 60.1 | ... | 40.7 | 14.7 | 29.0 | 65.1 |
| 160.0 | 46.4 | 59.4 | 102.0 | 72.9 | 49.5 | 64.2 | | 43.5 | 15.7 | 30.9 | 69.4 |
| 155.0 | 49.0 | 62.1 | 106.0 | 76.1 | 51.9 | 67.5 | | 45.8 | 16.5 | 32.6 | 72.9 |
| 150.0 | 51.1 | 64.3 | 109.0 | 78.6 | 53.9 | 70.3 | | 47.7 | 17.1 | 34.0 | 75.8 |
| 145.0 | 52.9 | 66.0 | 111.0 | 80.6 | 55.6 | 72.5 | | 49.2 | 17.7 | 35.1 | 78.1 |
| 140.0 | 54.4 | 67.4 | 113.0 | 82.2 | 56.9 | 74.3 | | 50.5 | 18.1 | 36.0 | 80.0 |
| 135.0 | 55.6 | 68.6 | 114.0 | 83.4 | 58.0 | 75.8 | | 51.6 | 18.5 | 36.8 | 81.4 |
| 130.0 | 56.6 | 69.5 | 115.0 | 84.3 | 58.9 | 77.0 | | 52.4 | 18.9 | 37.5 | 82.6 |
| 125.0 | 57.5 | 70.2 | 116.0 | 85.0 | 59.7 | 77.9 | | 53.2 | 19.2 | 38.0 | 83.4 |
| 120.0 | 58.2 | 70.7 | 117.0 | 85.6 | 60.3 | 78.6 | ... | 53.7 | 19.4 | 38.5 | 84.1 |
| 115.0 | 58.7 | 71.1 | 117.0 | 86.0 | 60.8 | 79.1 | | 54.2 | 19.6 | 38.9 | 84.6 |
| 110.0 | 59.2 | 71.5 | 118.0 | 86.3 | 61.2 | 79.5 | | 54.6 | 19.8 | 39.2 | 84.9 |
| 105.0 | 59.6 | 71.7 | 118.0 | 86.5 | 61.5 | 79.8 | | 54.9 | 20.0 | 39.4 | 85.2 |
| 100.0 | 59.9 | 71.9 | 118.0 | 86.7 | 61.7 | 80.0 | | 55.1 | 20.2 | 39.7 | 85.3 |
| 95.0 | 60.1 | 72.1 | 118.0 | 86.8 | 61.9 | 80.1 | | 55.3 | 20.3 | 39.9 | 85.5 |
| 90.0 | 60.3 | 72.2 | 118.0 | 86.9 | 62.1 | 80.3 | | 55.5 | 20.4 | 40.0 | 85.6 |
| 85.0 | 60.5 | 72.2 | 119.0 | 86.9 | 62.2 | 80.4 | | 55.6 | 20.5 | 40.2 | 85.7 |
| 80.0 | 60.6 | 72.3 | 119.0 | 87.0 | 62.4 | 80.5 | ... | 55.7 | 20.6 | 40.3 | 85.9 |

FIG. 8

| | Name of satellite | Int'l designator | Epoch | 1st derivative of mean motion | | B* | | Element number & checksum |
|---|---|---|---|---|---|---|---|---|
| | ARIRANG-2 (KOMPSAT-2) | | | | | | | |
| 1 | 29268U | 06031A | 21150.51297300 | .00000102 | 00000-0 | 29160-4 | 0 | 9998 |
| 2 | 29268 | 97.9427 | 30.4507 | 0018073 | 135.5385 | 224.7259 | 14.62365149 | 791936 |
| | Satellite ID | Inclination | RAAN | Eccentricity | Argument of perigee | Mean anomaly | Mean motion | Revolution number & checksum |

Time Varying Parameters in TLE

FIG. 9

| | epoch | n_dot | b* | i | RAAN | e | AOP | M | n |
|---|---|---|---|---|---|---|---|---|---|
| epoch | 1.00 | 0.82 | -0.69 | -0.46 | -0.45 | -0.68 | 0.19 | -0.16 | 0.96 |
| n_dot | 0.82 | 1.00 | -0.65 | -0.42 | -0.38 | -0.60 | 0.23 | -0.20 | 0.93 |
| b* | -0.69 | -0.65 | 1.00 | 0.32 | 0.26 | 0.43 | -0.15 | 0.16 | -0.75 |
| i | -0.46 | -0.42 | 0.32 | 1.00 | 0.18 | 0.32 | -0.16 | 0.15 | -0.46 |
| RAAN | -0.45 | -0.38 | 0.26 | 0.18 | 1.00 | 0.37 | -0.24 | 0.21 | -0.43 |
| e | -0.68 | -0.60 | 0.43 | 0.32 | 0.37 | 1.00 | -0.14 | 0.11 | -0.67 |
| AOP | 0.19 | 0.23 | -0.15 | -0.16 | -0.24 | -0.14 | 1.00 | -0.81 | 0.22 |
| M | -0.16 | -0.20 | 0.16 | 0.15 | 0.21 | 0.11 | -0.81 | 1.00 | -0.19 |
| n | 0.96 | 0.93 | -0.75 | -0.46 | -0.43 | -0.67 | 0.22 | -0.19 | 1.00 |

SYSTEM AND METHOD FOR PREDICTING TRAJECTORY OF OBJECT

CROSS-REFERENCE TO RELATED APPLICATION

This application claims priority under 35 U.S.C § 119 to Korean Patent Application No. 10-2021-0117437, filed in the Korean Intellectual Property Office on Sep. 3, 2021, the entire contents of which are hereby incorporated by reference.

BACKGROUND

Technical Field

The present disclosure relates to a system and a method for predicting trajectory of an object.

Background Art

Space development and application fields have expanded and the space objects have increased. With this, the number space debris re-entering the Earth's atmosphere has also rapidly increased. The technology of predicting trajectory of the re-entering space debris is necessary for the purpose of warning the risk factors for a fall, or the like.

The related technology for the prediction of trajectory of re-entering space debris generally uses a method of predicting trajectory of the re-entering space debris based on a physical law (dynamic modeling). Meanwhile, the prediction of trajectory of re-entering space debris is performed through correction of observation data, estimation and optimization of control parameters, but there is a limit to precise prediction due to various types of uncertainties. Further, there is a problem that the existing method could not be generalized and applied to various objects.

SUMMARY

A technical challenge to be solved by the present disclosure is to provide a system and a method capable of more accurate prediction than based on physical laws (dynamic modeling) and predicting trajectory of an object by generalization to various objects.

In order to solve the technical problems described above, a method for predicting trajectory of an object according to the present disclosure may include constructing a training data set using past actual orbit information of a target object, in which the training data set may include a plurality of pairs of input sequence data corresponding to a trajectory in a first section before a reference point, and output sequence data corresponding to a trajectory in a second section after the reference point, training an object trajectory prediction model using the training data set, and predicting the trajectory of the prediction target object after the reference point, by inputting input sequence data corresponding to an actual trajectory of the prediction target object before the reference point into the object trajectory prediction model.

The constructing the training data set may include obtaining altitude data of the target object at a specific point in time from the past actual orbital information of the target object, determining an approximation function that expresses an altitude of the target object over time by using curve fitting on the obtained altitude data, generating, using the approximation function, altitude profile sequence data sequentially listing an elapsed time at each of altitudes divided at equal intervals in order from a first altitude to a second altitude, in which the elapsed time may be a time taken for the target object from the first altitude to reach each of the altitudes; and dividing the altitude profile sequence data into input sequence data corresponding to a first section before the reference point, and output sequence data corresponding to a second section after the reference point.

The training data set may be obtained for each type of shape of a predetermined object, and the object trajectory prediction model may be trained for each type of shape of the object.

The object trajectory prediction model may be any one of Recurrent Neural Network (RNN), Gated Recurrent Unit (GRU), Long Short Term Memory (LSTM), and Sequence-to-Sequence (Seq2Seq).

The object may be a re-entering object to the Earth.

The method may include obtaining altitude data of the re-entering object at a specific point in time from basic orbital information (two-line element, TLE) data of the re-entering object, determining an approximation function that expresses an altitude of the re-entering object over time by using curve fitting on the obtained altitude data, generating, using the approximation function, altitude profile sequence data sequentially listing an elapsed time at each of altitudes divided at equal intervals in order from a first altitude to a second altitude, in which the elapsed time may be a time taken for the re-entering object from the first altitude to reach each of the altitudes, and dividing the altitude profile sequence data into input sequence data corresponding to a first section before the reference point, and output sequence data corresponding to a second section after the reference point.

The system may obtain the altitude data of the re-entering object using a mean motion value included in the basic orbital information data of the re-entering object, or may obtain the altitude data of the re-entering object using the mean motion value in conjunction with at least one of a first derivative value of the mean motion and a B* parameter value.

According to the present disclosure, it is possible to predict the trajectory of an object more accurately than based on conventional physical laws (dynamic modeling), and accurately predict the trajectory of a re-entering object to the Earth by generalization to various other objects. In particular, when the Seq2Seq method is applied, it is possible to accurately predict the trajectory without updating the trajectory observation data for the re-entering object.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which:

FIG. 6 illustrates a training data set;

FIG. 8 illustrates time-varying parameters included in TLE data;

FIG. 9 shows a correlation analysis result of time-varying parameters included in TLE data.

DETAILED DESCRIPTION

Hereinafter, certain embodiments will be described in detail with reference to the accompanying drawings to help those with ordinary knowledge in the art easily achieve the present disclosure.

Figure 1:
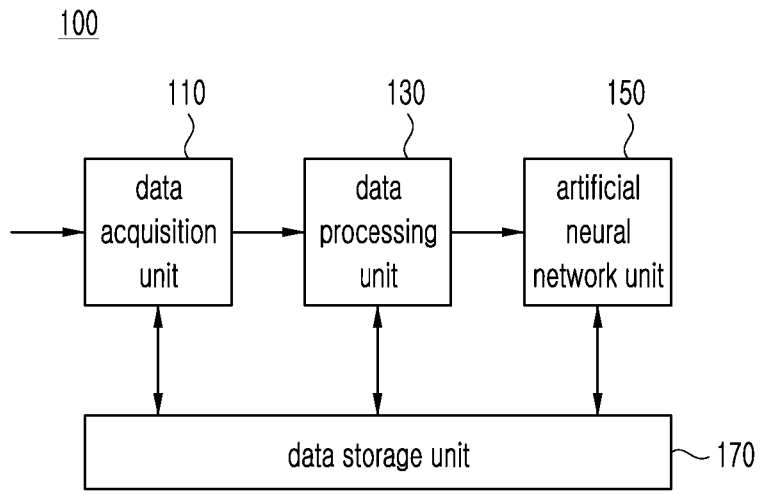
FIG. 1 is a block diagram of a system for predicting trajectory of re-entering object according to an exemplary embodiment.

FIG. 1 is a block diagram of a system for predicting trajectory of re-entering object according to an exemplary embodiment.

Referring to FIG. 1, a system 100 for predicting trajectory of re-entering object may include a data acquisition unit 110, a data processing unit 130, an artificial neural network unit 150, and a data storage unit 170.

The system 100 for predicting trajectory of re-entering object according to an exemplary embodiment may train a re-entry trajectory prediction model with training data constructed based on past actual trajectory data of an object (hereinafter referred to as "re-entering object") that actually re-entered the Earth's atmosphere, and predict the trajectory of the re-entering object of interest using the same.

First, the trajectory of re-entering object over time may be defined as T.

$$T=\{a_{t_1}, a_{t_2}, \ldots, a_{t_N}, a_{t_{N+1}}, a_{t_{N+2}}, \ldots, a_{t_F}\} \quad \text{[Equation 1]}$$

where, $a_{t_i}$ denotes an altitude of the re-entering object at time point $t_i$ (i=1, 2, ..., N, N+1, N+2, ..., F), $t_N$ denotes the trajectory prediction start point, and $t_F$ denotes the predicted re-entry point.

The re-entry trajectory prediction model may predict trajectory $T_{pred}=\{a_{t_{N+1}}, a_{t_{N+2}}, \ldots, a_{t_F}\}$ after the trajectory prediction start time point, using a trajectory $T_{hist}=\{a_{t_1}, a_{t_2}, \ldots, a_{t_N}\}$ that is given before the trajectory prediction start time point.

For example, the trajectory prediction start point $t_N$ may be determined to be a predetermined reference time point. For example, the point when the re-entering object passes an altitude of 120 km may be determined to be the trajectory prediction start point, and the point when the re-entering object reaches an altitude of 80 km may be evaluated to be the re-entry point $t_F$. It is goes without saying that, depending on embodiments, altitude as a reference for the re-entry point, or altitude as a reference for the trajectory prediction start point may vary.

As shown in Equation 2, for the training data set required for training the re-entry trajectory prediction model, the trajectory data of the objects that actually re-entered the Earth's atmosphere in the past may be used.

$$\{T_{hist_j}, T_{pred_j}\}_{j=1, \ldots, S}^{train} \quad \text{[Equation 2]}$$

where, j is an index of objects that actually re-entered the Earth's atmosphere in the past, and Equation 2 represents that training data set is constructed using the trajectory data of a total of S re-entry objects. $T_{hist_j}$ is the input sequence data for the j-th re-entering object, and $T_{pred_j}$ is the output sequence data for the j-th re-entering object.

When the re-entry prediction model (Mpred) trained by using the trajectory data of the objects that actually re-entered the Earth's atmosphere in the past is constructed, the trajectory of the re-entering object of interest can be calculated through Equation 3.

$$\{\tilde{T}_{pred}\}^{test} = M_{pred}\{\tilde{T}_{hist}\}^{test} \quad \text{[Equation 3]}$$

where, $\{\tilde{T}_{hist}\}^{test}$ is the input sequence data of the re-entering object of interest before the prediction start point, and $\{\tilde{T}_{pred}\}^{test}$ denotes the trajectory (output sequence data) of the re-entering object of interest predicted through the re-entry prediction model (Mpred).

Figure 2:
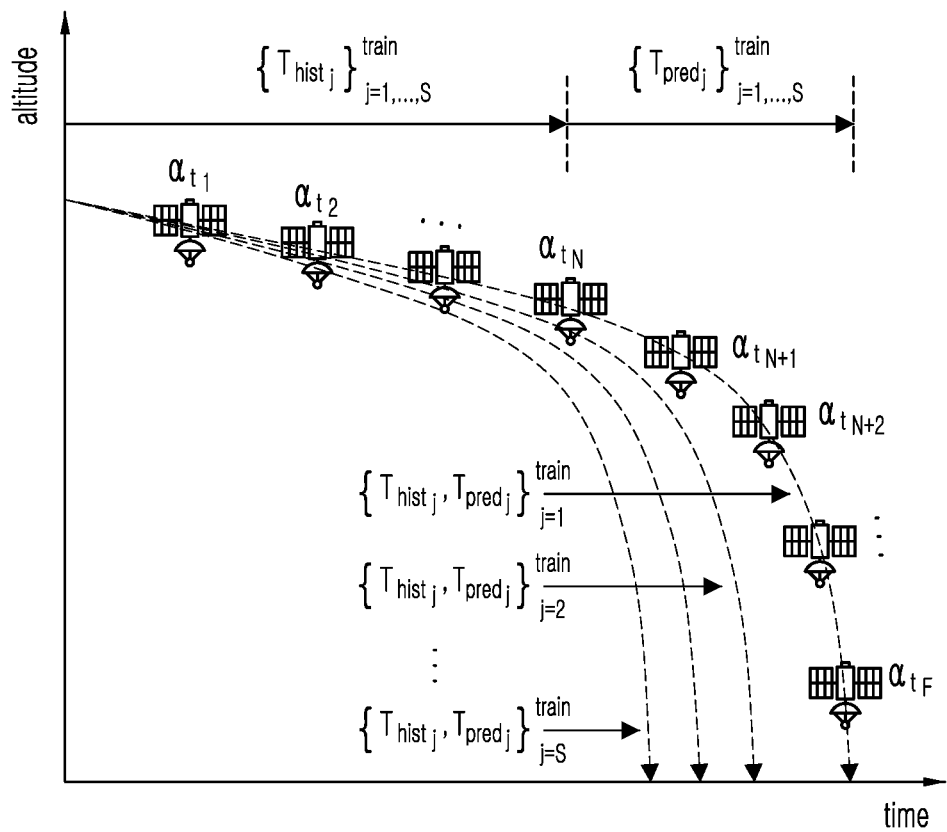
FIG. 2 shows input sequence data and output sequence data in trajectory data of a re-entering object used in the training process.
Figure 3:
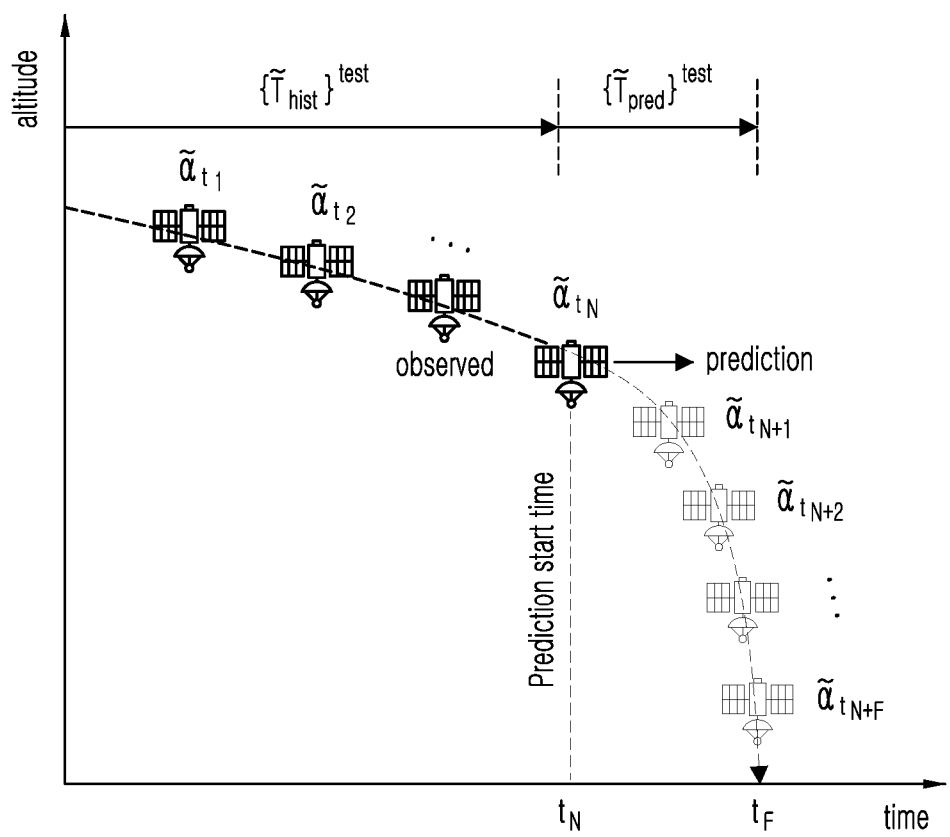
FIG. 3 shows input sequence data of a re-entering object of interest used in a prediction process, and output sequence data predicted therefrom.

FIG. 2 shows input sequence data and output sequence data in the trajectory data of the re-entering object used in the training process. FIG. 3 shows input sequence data of a re-entering object of interest used in the prediction process, and output sequence data predicted therefrom.

FIG. 2 schematically shows the trajectory data $\{T_{hist_j}, T_{pred_j}\}_{j=1, \ldots, S}^{train}$ of S number of objects that re-entered the Earth's atmosphere in the past for use in the training process, and S number of input sequence data $\{T_{hist_j}\}_{j=1, \ldots, S}^{train}$, and S number of output sequence data train $\{T_{pred_j}\}_{j=1, \ldots, S}^{train}$ obtained therefrom.

FIG. 3 schematically shows how the input sequence data $\{\tilde{T}_{hist}\}^{test}$ of the re-entering object of interest is input to the re-entry prediction model (Mpred) in the prediction process to obtain the output sequence data $\{\tilde{T}_{pred}\}^{test}$ corresponding to the trajectory of the re-entering object of interest Referring to FIG. 1 again, the data acquisition unit 110 may acquire orbital information of the re-entering object. The data acquisition unit 110 in the training process may acquire the orbital information of the objects that actually re-entered the Earth's atmosphere in the past, and the data acquisition unit 110 in the prediction process may acquire the orbital information of the re-entering object of interest. For the orbital information of the re-entering object, the two-line element (TLE) data, and the like may be used. The re-entering object may be a space object, such as a satellite, a projectile top stage, space junk, or the like.

The data processing unit 130 may pre-process the past actual orbital information of the re-entering object, such as TLE data, to construct a training data set. The training data set may be constructed with the trajectory data of a plurality of objects re-entering the Earth's atmosphere, including the input sequence data and the output sequence data obtained by pre-processing the TLE data.

The data processing unit 130 may obtain altitude data of the re-entering object at a specific point in time (Epoch) from the TLE data of the re-entering object. The data processing unit 130 may determine an approximation function such as Equation 4 below, which expresses an altitude of the re-entering object over time by using curve fitting on the altitude data obtained from the TLE data. It goes without saying that depending on embodiments, a curve fitting function different from that expressed in Equation 4 may be used.

$$f(t) = a_1 + \sum_{k=2}^{n} a_k (t_{ref} - t)^{\frac{1}{k}} \quad \text{[Equation 4]}$$

where, $t_{ref}$ denotes the actual re-entry point of the re-entering object. When the training data is for an object that actually re-entered the Earth's atmosphere, $t_{ref}$ corresponds to a ground truth that is already known. $a_k$ is a coefficient obtained through curve fitting with the least square method, for example.

Figure 4:
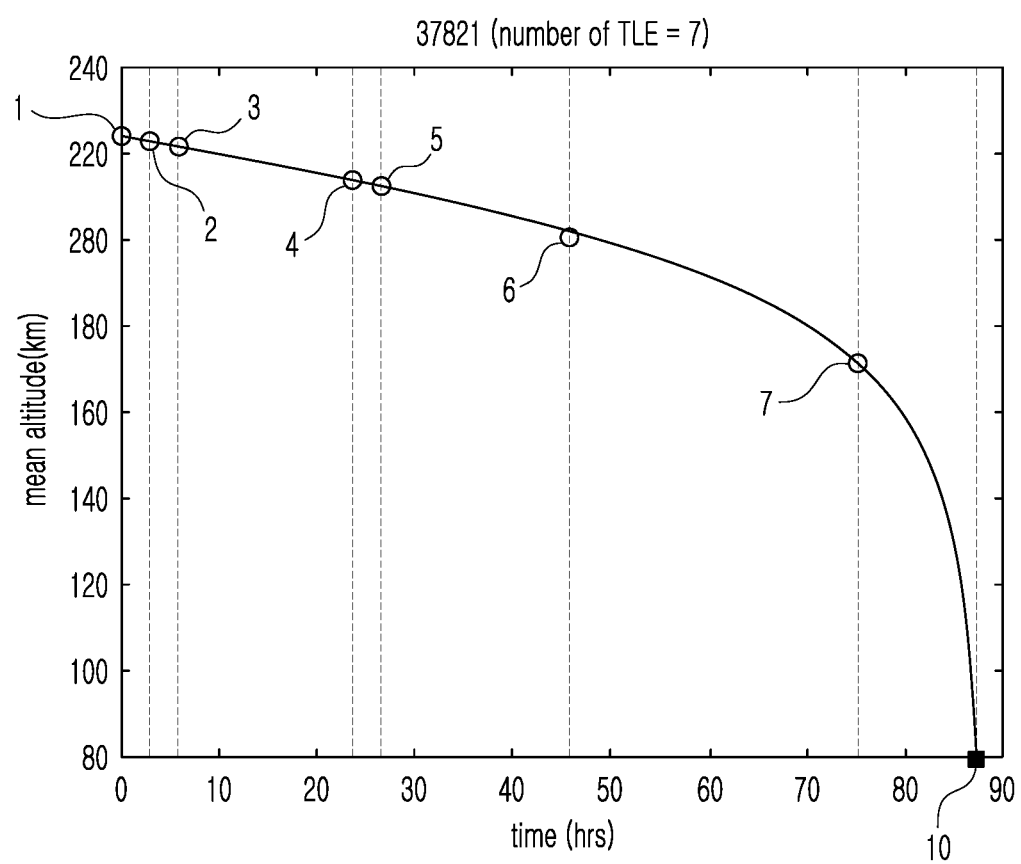
FIGS. 4 and 5 show results of applying curve fitting to an altitude extracted from TLE data.
Figure 5:
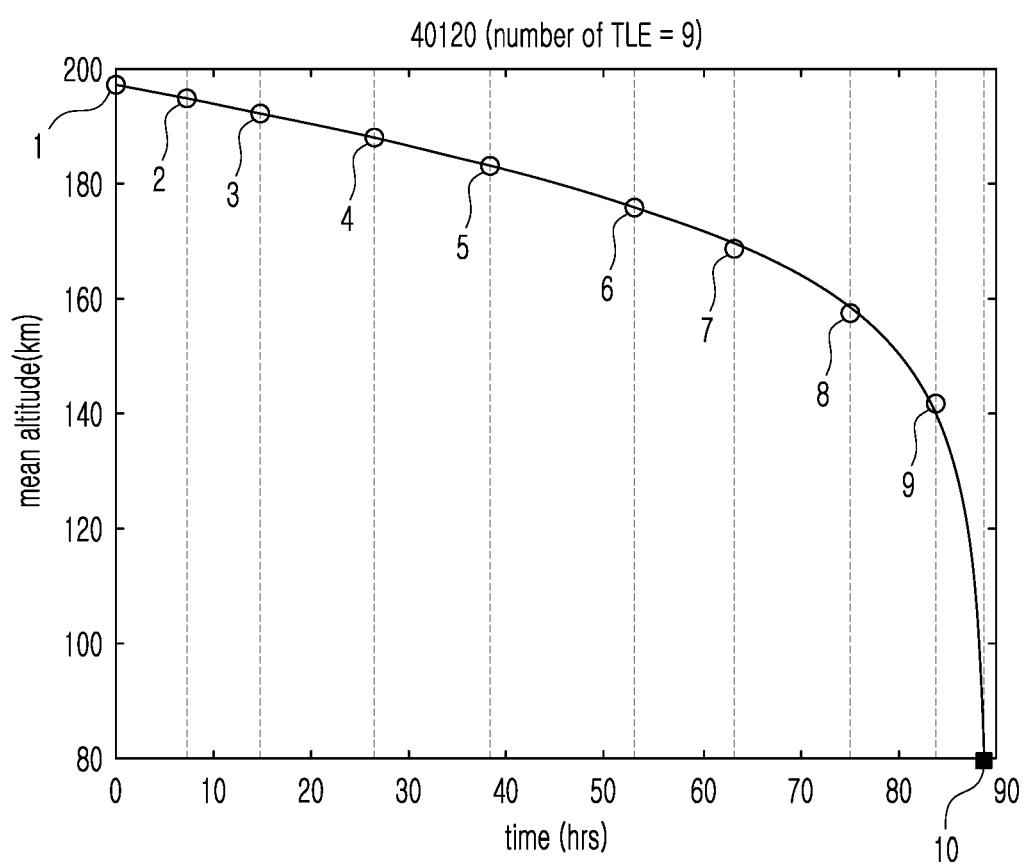

FIGS. 4 and 5 show results of applying curve fitting to an altitude extracted from the TLE data.

In FIGS. 4 and 5, each circle (1, 2, 3, 4, 5, 6, 7, 8, and 9) denotes an altitude for a specific point in time (Epoch, represented by a vertical line) obtained from the TLE data, and a rectangle 10 indicates $t_{ref}$ which is the actual re-entry point of the re-entering object. An approximation function representing an altitude of the re-entering object over time can be obtained by curve fitting on the data corresponding to the circles (1, 2, 3, 4, 5, 6, 7, 8, 9) and the rectangle (10).

FIG. 4 is a function graph showing an altitude over time of the re-entering object obtained by using 7 TLE data, and FIG. 5 is a function graph showing an altitude over time of the re-entering object obtained by using 9 TLE information.

The approximation function obtained by applying curve fitting to the altitude data extracted from the TLE data expresses the altitude change over time. However, since the point of re-entry into Earth's atmosphere is different for each object, the data may be converted into the form of "time over altitude" instead of "altitude over time" in order to make the length of the training data set the same. For example, by defining the point at which the re-entering object passes an altitude of 200 km as "0", the altitude between 200 km and 80 km may be regarded as an independent variable having the same range, and the point of passing each altitude may be defined as a dependent variable corresponding to the elapsed time from the altitude 200 km.

The data processing unit 130 may generate altitude profile sequence data obtained by sequentially listing an elapsed time (time taken for the re-entering object from the first altitude to reach the corresponding altitude) at each of altitudes divided at equal intervals from the first altitude (e.g., 200 km) to the second altitude (e.g., 80 km, re-entry altitude), based on the approximation function expressing the altitude over time of the re-entering object. In addition, the data processing unit 130 may generate a training data set by dividing the altitude profile sequence data into the input sequence data before the trajectory prediction start point $t_N$, and the output sequence data after the trajectory prediction start point $t_N$.

FIG. 6 illustrates a training data set.

Referring to FIG. 6, a training data set is shown, which includes the sequence data including elapsed time for every 5 km of altitude decrease, with the point of passing 200 km of the altitude (ALT) being "0". The data set (trj #1) shows an elapsed time of "0" at an altitude of 200 km, an elapsed time (hours) of "9.5" at altitude 195 km, . . . , and an elapsed time of "60.6" at an altitude of 80 km. The data set (trj #211) shows an elapsed time of "0" at an altitude of 200 km, an elapsed time of "14.2" at altitude 195 km, . . . , and an elapsed time of "85.9" at an altitude of 80 km.

If the trajectory prediction start point is set to an altitude of 120 km, then the data of a sequence of elapsed times in the first section from an altitude of 200 km to an altitude of 120 km corresponds to the input sequence data, and the data of a sequence of elapsed times in the second section from an altitude of 120 km to an altitude of 80 km corresponds to the output sequence data.

Figure 7:
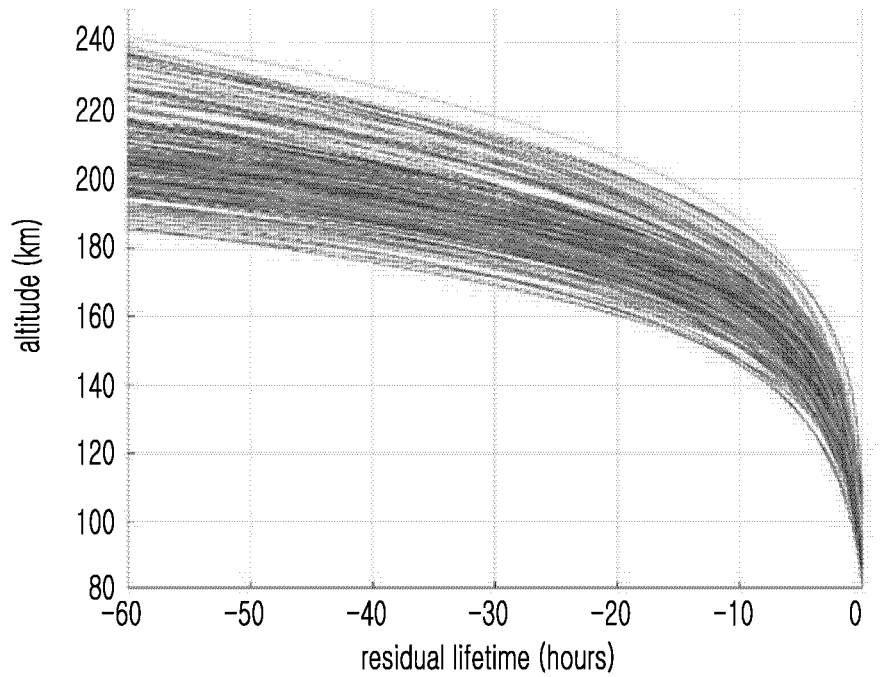
FIG. 7 shows a graphical representation of the training data set of FIG. 6.
Figure 7:
Figure 7:
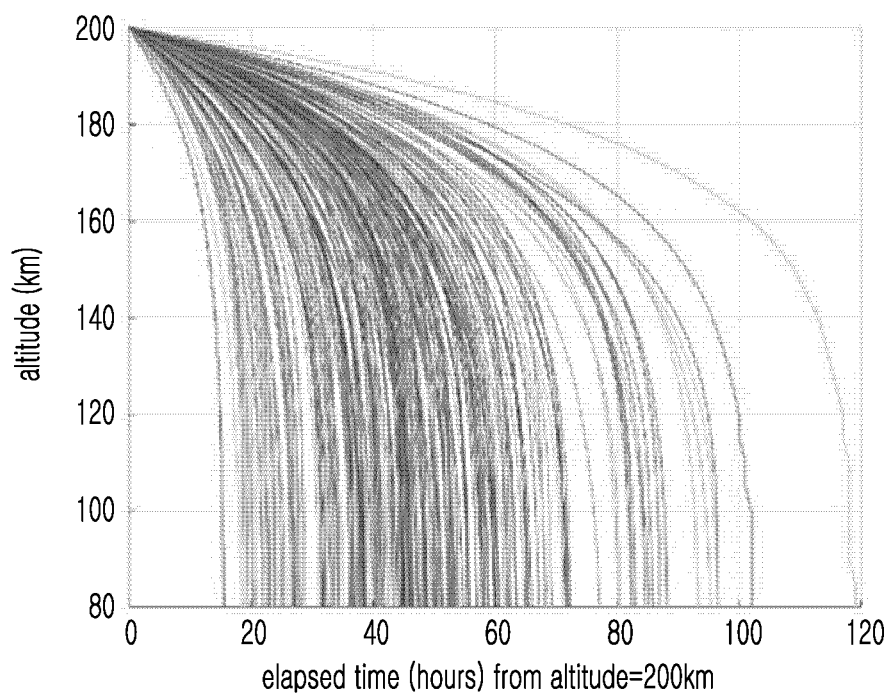

FIG. 7 shows a graphical representation of the training data set of FIG. 6.

Referring to FIG. 7, it can be seen that the left side shows trajectories from different altitudes up to an altitude of 80 km, whereas the right side shows trajectories from an altitude of 200 km to an altitude of 80 km.

Altitude data is not directly included in the TLE data. Therefore, altitude is calculated from the TLE data. With the data-driven method as the one used in the present disclosure, it is important which features are selected for calculating the altitude data. The time-varying parameters included in the TLE data, which can be used as basic input information necessary for configuring the training data set, are illustrated in FIG. 8.

FIG. 8 illustrates the time-varying parameters included in TLE data, and FIG. 9 shows a correlation analysis result of the time-varying parameters included in the TLE data.

Among the parameters of the time-varying parameters included in the TLE data illustrated in FIG. 8, the parameters directly related to the altitude, that is, mean motion(n) representing the speed of orbital motion and the first derivative value of the mean motion (n_dot, $1^{st}$ derivative of mean motion), and B*(b*) parameter that is related to atmospheric drag, are selected as the features by the correlation analysis.

Referring to FIG. 9, it can be seen that the mean motion(n) and the first derivative value of the mean motion, and B*(b*) parameter values have high correlation.

It is possible to obtain the corresponding altitude of the re-entering object by using, among the time-varying parameters included in the TLE data: 1) only the mean motion value; 2) the mean motion value in conjunction with the first derivative value of the mean motion or the B*(b*) parameter value; or 3) the mean motion value in conjunction with the first derivative value of the mean motion and B*(b*) parameter value. Calculating an altitude of a re-entering object at a specific point in time (Epoch) by using a mean motion value is already well known to those skilled in the art.

According to Kepler's third law, the square of the orbital period of a space object (artificial satellite, and the like) is proportional to the cube of the major radius of the orbit, as shown in Equation 5 below, and accordingly, the major radius ($\alpha$) of the orbit can be obtained from the mean motion value (n), and the altitude of the space object (artificial satellite, and the like) can be obtained by subtracting the Earth's average radius (6378.13 km) from the major radius of the orbit. In Equation 5, $\mu$ is the Earth's gravitational constant, which is about 398600 ($km^3 s^{-2}$).

$$a = \left(\frac{\mu}{n^2}\right)^{1/3} \quad \text{[Equation 5]}$$

Referring to FIG. 1 again, the artificial neural network unit 150 may train the re-entry trajectory prediction model by using a training data set constructed using the past actual trajectory data of the re-entering object.

The artificial neural network unit 150 may input the actual trajectory data before the trajectory prediction start point of the re-entering object of interest into the trained re-entry trajectory prediction model, and output the trajectory prediction result after the trajectory prediction start point of the re-entering object of interest. That is, the artificial neural network unit 150 may receive the input sequence data of the re-entering object of interest and output the output sequence data corresponding to the trajectory after the trajectory prediction start point.

To this end, the artificial neural network unit 150 may use a neural network algorithm applying a deep learning technique. The artificial neural network unit 150 may be implemented as a deep learning model that receives sequence data and outputs sequence data. Specifically, the deep learning model may be implemented with Recurrent Neural Network (RNN), Gated Recurrent Unit (GRU), Long Short Term Memory (LSTM), Sequence-to-Sequence (Seq2Seq), and the like.

The data storage unit 170 may store various types of information, data, programs, and the like related to the operation of the system 100 for predicting trajectory of a re-entering object.

Figure 10:
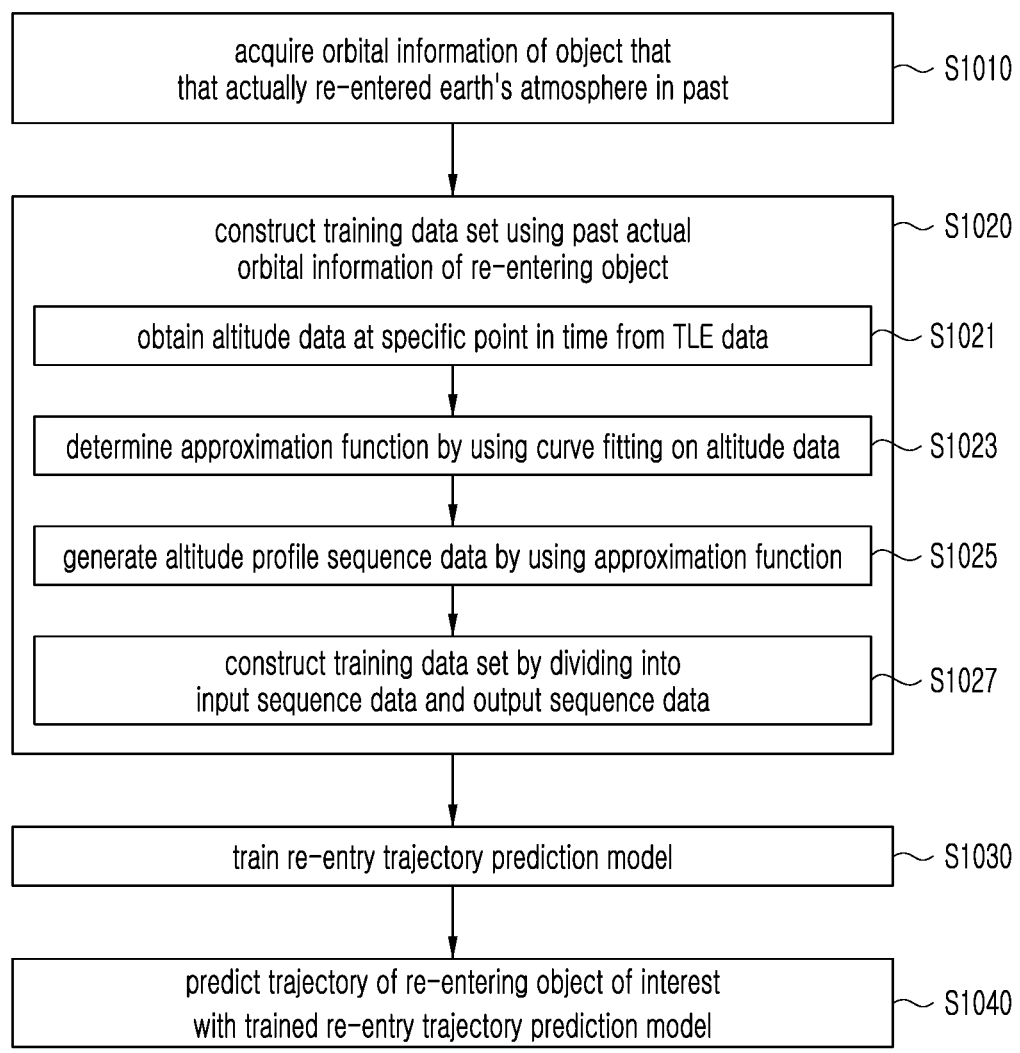
FIG. 10 is a flowchart provided to explain a method for predicting trajectory of re-entering object according to an exemplary embodiment.

FIG. 10 is a flowchart provided to explain a method for predicting trajectory of a re-entering object according to an exemplary embodiment.

Referring to FIGS. 1 and 10, first, the data acquisition unit 110 may acquire orbital information of an object that actually re-entered the Earth's atmosphere in the past, at S1010. The orbital information of the re-entering object acquired at S1010 may be two-line element (TLE) data of the objects that actually re-entered the Earth's atmosphere in the past.

Next, the data processing unit 130 may pre-process the past actual orbital information of the re-entering object to construct a training data set, at S1020.

To describe step S1020 in more detail, first, the data processing unit 130 may obtain altitude data of the re-entering object at a specific point in time (Epoch) from the TLE data of the re-entering object, at S1021.

In addition, the data processing unit 130 may determine an approximation function that expresses an altitude of the re-entering object over time by using curve fitting on the altitude data obtained at S1021, at S1023.

Next, the data processing unit 130 may generate, using the approximation function, the altitude profile sequence data that sequentially lists the elapsed time (time it takes for a re-entering object from the first altitude to reach the corresponding altitude) at each of altitudes divided at equal intervals from the first altitude (e.g., 200 km) to the second altitude (e.g., 80 km, re-entry altitude), at S1025.

In addition, the data processing unit 130 may construct a training data set by dividing the altitude profile sequence data obtained at S1025 into input sequence data before the trajectory prediction start point $t_N$, i.e., the input sequence data in the first section, and output sequence data after the trajectory prediction start point $t_N$, i.e., the output sequence data in the second section, at S1027.

Next, the artificial neural network unit 150 may train the re-entry trajectory prediction model using a training data set constructed using the past actual trajectory data of the re-entering object, at S1030.

Finally, the artificial neural network unit 150 may input the actual trajectory data (the input sequence data) before the trajectory prediction start point of the re-entering object of interest into the re-entry trajectory prediction model, and output the trajectory prediction result (the output sequence data) after the trajectory prediction start point of the re-entering object of interest, at S1040. The input sequence data obtained by pre-processing the orbital information of the re-entering object of interest in the same manner as in S1020 may be used in the prediction process in S1040.

While the shape of the re-entering object is not taken into consideration in the embodiment described above, the trajectory of the object can be more accurately predicted by considering the shape of the object. For example, the shape of each re-entering object may be classified into a cuboid, a cylinder, a sphere, and the like, and the training data set may be separately constructed for each classified shape. In addition, the re-entering object trajectory prediction model may be trained for each type of shape of the object. Then, the shape of the prediction target object may be checked first, and the object trajectory may be predicted by using the object trajectory prediction model trained according to the corresponding shape.

Meanwhile, according to the present disclosure, it is possible to predict trajectories of not only the objects re-entering the Earth's atmosphere, but also various other objects. The training data set for the target object may be constructed in the same way as described above, using the past actual orbital information of the target object. In addition, the object trajectory prediction model may be trained by using the training data set constructed for the corresponding object. Then, the input sequence data corresponding to the actual trajectory before the reference point of the actual prediction target object may be input into the object trajectory prediction model to predict the object trajectory after the reference point. Of course, like the case of the object re-entering the Earth's atmosphere, for the other objects, the object trajectory prediction model may also be trained for each type of shape of the objects and used for the object trajectory prediction.

The embodiments described above may be implemented as a hardware component, a software component, and/or a combination of a hardware component and a software component.

For example, the devices, methods, and components described in the embodiments may be implemented by using one or more general computer or specific-purpose computer such as a processor, a controller, an arithmetic logic unit (ALU), a digital signal processor, a microcomputer, a field programmable gate array (FPGA), a programmable logic unit (PLU), a microprocessor, or any other device capable of executing instructions and responding thereto. The processing device may execute an operating system (OS) and one or more software applications executed on the operating system. Further, the processing device may access, store, operate, process, and generate data in response to the execution of software. For convenience of understanding, it is described in certain examples that one processing device is used, but one of ordinary skill in the art may understand that the processing device may include a plurality of processing elements and/or a plurality of types of processing elements. For example, the processing device may include a plurality of processors or one processor and one controller. In addition, other processing configurations such as a parallel processor are possible.

The software may include a computer program, code, instructions, or a combination of one or more of the above, and may configure the processing device, or instruct the processing device independently or collectively to operate as desired. Software and/or data may be interpreted by the processing device or, in order to provide instructions or data to the processing device, may be embodied in any type of machine, component, physical device, virtual equipment, or computer storage medium or device, permanently or temporarily. The software may be distributed over networked computer systems and stored or executed in a distributed manner. The software and data may be stored on one or more computer-readable recording media.

The method according to the embodiments may be implemented in the form of program instructions that can be executed through various computer means and recorded in a computer-readable medium. The computer readable medium may include program instructions, data files, data structures, and the like alone or in combination. The program instructions recorded on the medium may be those specially designed and configured for the purposes of the embodiments, or may be known and available to those skilled in computer software. Examples of computer readable recording medium include magnetic media such as hard disks, floppy disks, and magnetic tape, optical media such as CD-ROMs and DVDs, magneto-optical media such as floptical disks, and hardware devices specifically configured to store and execute program instructions such as ROM, RAM, flash memory, and the like. Examples of the program instructions include machine language codes such as those generated by a compiler, as well as high-level language codes that may be executed by a computer using an interpreter, and so on. The hardware device described above may be configured to operate as one or more software modules in order to perform the operations according to the embodiments, and vice versa.

As described above, although the embodiments have been described with reference to the limited drawings, a person of ordinary skill in the art can apply various technical modifications and variations based on the above. For example, even when the described techniques are performed in the order different from the method described above, and/or even when the components of the system, structure, device, circuit, and the like are coupled or combined in a form different from the way described above, or replaced or substituted by other components or equivalents, an appropriate result can be achieved.

The invention claimed is:

1. A method for predicting trajectory of an object, the method comprising:
constructing, at a data processing unit, a training data set using past actual orbital information of a target object, wherein the training data set includes a plurality of pairs of input sequence data corresponding to a trajectory in a first section before a reference point, and output sequence data corresponding to a trajectory in a second section after the reference point;
training, at an artificial neural network unit, an object trajectory prediction model using the training data set; and
predicting, at the artificial neural network unit, the trajectory of the prediction target object after the reference point, by inputting input sequence data corresponding to an actual trajectory of the prediction target object before the reference point into the object trajectory prediction model,
wherein the constructing the training data set includes:
obtaining altitude data of the target object at a specific point in time from the past actual orbital information of the target object;
determining an approximation function that expresses an altitude of the target object over time by using curve fitting on the obtained altitude data;
generating, using the approximation function, altitude profile sequence data sequentially listing an elapsed time at each of altitudes divided at equal intervals in order from a first altitude to a second altitude, wherein the elapsed time is a time taken for the target object from the first altitude to reach each of the altitudes; and
dividing the altitude profile sequence data into input sequence data corresponding to a first section before the reference point, and output sequence data corresponding to a second section after the reference point.

2. The method according to claim 1, wherein the training data set is obtained for each type of shape of a predetermined object, and the object trajectory prediction model is trained for each type of shape of the object.

3. The method according to claim 1, wherein the object trajectory prediction model is any one of Recurrent Neural Network (RNN), Gated Recurrent Unit (GRU), Long Short Term Memory (LSTM), and Sequence-to-Sequence (Seq2Seq).

4. The method according to claim 1, wherein the object is a re-entering object to the Earth.

5. The method according to claim 4, wherein the past actual orbital information of the target object is basic orbital information (TLE) data of the re-entering object.

6. The method according to claim 5, comprising obtaining altitude data of the re-entering object using a mean motion value included in the basic orbital information data of the re-entering object, or obtaining the altitude data of the re-entering object using the mean motion value in conjunction with at least one of a first derivative value of the mean motion and a B* parameter value.

7. The method according to claim 6, wherein the training data set is obtained for each type of shape of a predetermined object, and the object trajectory prediction model is trained for each type of shape of the object.

8. The method according to claim 7, wherein the object trajectory prediction model is any one of Recurrent Neural Network (RNN), Gated Recurrent Unit (GRU), Long Short Term Memory (LSTM), and Sequence-to-Sequence (Seq2Seq).

9. A system for predicting trajectory of an object, the system comprising a processor and instructions executable by the processor to implement:
a data processing unit configured to construct a training data set using past actual orbital information of a target object, wherein the training data set includes a plurality of pairs of input sequence data corresponding to a trajectory in a first section before a reference point, and output sequence data corresponding to a trajectory in a second section after the reference point, and further configured to execute the instructions to:
(i) obtain altitude data of the target object at a specific point in time from the past actual orbital information of the target object;
(ii) determine an approximation function that expresses an altitude of the target object over time by using curve fitting on the obtained altitude data;
(iii) generate, using the approximation function, altitude profile sequence data sequentially listing an elapsed time at each of altitudes divided at equal intervals in order from a first altitude to a second altitude, wherein the elapsed time is a time taken for the target object from the first altitude to reach each of the altitudes; and
(iv) divide the altitude profile sequence data into input sequence data corresponding to a first section before the reference point, and output sequence data corresponding to a second section after the reference point; and
an artificial neural network unit configured to execute instructions to train an object trajectory prediction model using the training data set constructed by the data processing unit by applying a deep learning algorithm implemented as one of a Recurrent Neural Network (RNN) Gated Recurrent Unit (GRU), Long Short Term Memory (LSTM), or Sequence-to-Sequence (Seq2Seq), and predict the trajectory of the prediction target object after the reference point, by inputting input sequence data corresponding to an actual trajectory of the prediction target object before the reference point into the object trajectory prediction model.

10. The system according to claim 9, wherein the training data set is obtained for each type of shape of a predetermined object, and the object trajectory prediction model is trained for each type of shape of the object.

11. The system according to claim 9, wherein the object is a re-entering object to the Earth.

12. The system according to claim 11, wherein the past actual orbital information of the target object is basic orbital information (TLE) data of the re-entering object.

13. The system according to claim 12, obtaining altitude data of the re-entering object using a mean motion value included in the basic orbital information data of the re-entering object, or obtaining the altitude data of the re-entering object using the mean motion value in conjunction with at least one of a first derivative value of the mean motion and a B* parameter value.

14. The system according to claim 13, wherein the training data set is obtained for each type of shape of a predetermined object, and the object trajectory prediction model is trained for each type of shape of the object.

* * * * *